Patented Nov. 24, 1931

1,833,770

UNITED STATES PATENT OFFICE

ROBERT BERLINER, OF LEVERKUSEN-ON-THE-RHINE, GERMANY, ASSIGNOR TO GENERAL ANILINE WORKS, INC., OF NEW YORK, N. Y., A CORPORATION OF DELAWARE

VAT DYESTUFFS OF THE ACRIDONE SERIES

No Drawing. Application filed June 14, 1929, Serial No. 371,065, and in Germany July 4, 1928.

The present invention relates to new vat dyestuffs of the anthraquinone acridone series.

In my copending application Ser. No. 359,724 filed May 1, 1929, there are described new vat dyestuffs of the anthraquinone acridone series being obtainable by reacting upon a halogenated anthraquinone acridone containing 3 or more halogen atoms in the molecule with an amino-anthraquinone compound.

I have found that vat dyestuffs of valuable fastness properties, especially to light, are obtainable by replacing the aminoanthraquinone compound by a halogenated aromatic amine, such as monochloroanilines, 2.5-dichloroaniline, 3.5-dibromoaniline, 3.4.5-trichloroaniline, 1-amino-4.8-dichloronaphthalene and the like.

I prefer to perform the reaction by causing a halogenated anthraquinone acridone of the probable formula:

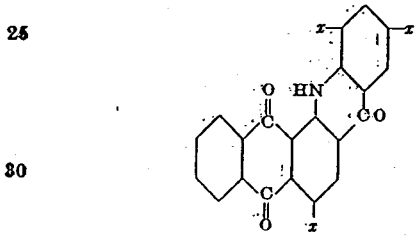

wherein the three x's stand for halogenatoms, such as bromo- or chloro- atoms, obtainable, for example, by brominating or chlorinating the corresponding anthraquinone acridone according to known methods, to react with a halogenated aromatic amine, advantageously in the presence of a suitable high boiling organic solvent and an acid binding medium at temperatures between about 180° C. and the boiling point of the reaction mixture. As suitable high boiling organic solvents nitrobenzene, naphthalene, trichlorobenzene or the like may be mentioned by way of example; suitable as acid binding media are, for example, sodium acetate, potassium-carbonate, sodium carbonate and the like. In some cases it will be advantageous to add to the reaction mixture a small amount of copper or a suitable copper salt, such as copper chloride, copper bromide, cuprous bromide, copper acetate and the like in order to accelerate the reaction.

My new compounds, thus obtainable, are formed according to the equation:

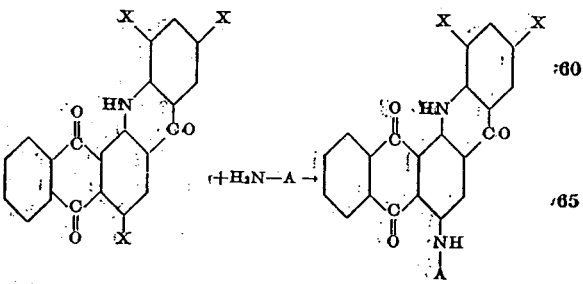

wherein the x's stand for halogen atoms and A means a halogenated aromatic nucleus. They form green crystals, difficultly soluble in the usual organic solvents, soluble in strong sulfuric acid with yellow to brown colorations, and they dye cotton from an alkaline hydrosulfite vat strong bluish green to green shades of good fastness properties, especially to light.

The following examples illustrate my invention, without limiting it thereto, the parts being by weight:

Example 1.—10 parts of trichloroanthraquinone acridone of the probable formula:

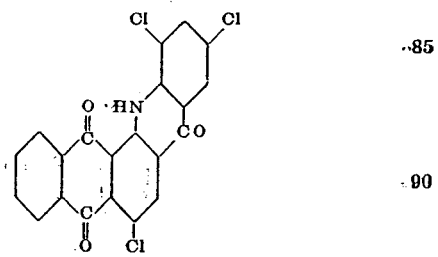

are heated to boiling with 200 parts of 2.5-dichloroaniline, 2 parts of sodium acetate and 0,5 part of copper chloride for about 5–6 hours, whereby the color of the reaction mixture turns to a dirty brownish red. After cooling alcohol is added and filtered. The residue is boiled up with diluted hydrochloric acid and washed with water until neutral. The product thus obtainable which probably corresponds to the formula:

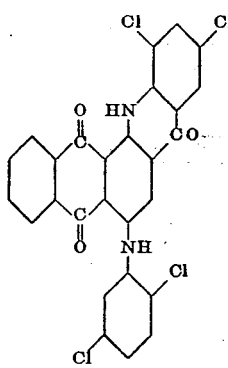

crystallizes from nitrobenzene in the form of green needles, difficultly soluble in the usual organic solvents, soluble in concentrated sulfuric acid with an orange coloration, dyeing cotton from a violet alkaline hydrosulfite vat strong bluish green shades of good fastness properties, especially to light.

*Example 2.*—20 parts of the trichloroanthraquinone acridone of Example 1, 50 parts of 3.5-dichloroaniline, 5 parts of sodium acetate and 50 parts of naphthalene are heated to boiling for about 5—6 hours. After cooling solvent-naphtha is added and the mixture is worked up in the usual manner. The product thus obtainable crystallizes from nitrobenzene in the form of green needles and has nearly the same properties as the product described in Example 1. It has the following probable formula:

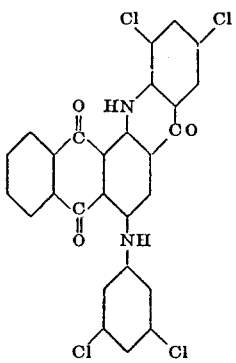

*Example 3.*—20 parts of the trichloroanthraquinone acridone of Example 1, 10 parts of 3.4.5-trichloroaniline, 5 parts of sodium carbonate, 0,5 part of copper powder and 200 parts of naphthalene are boiled together for about 2 days. After dilution with solvent-naphtha the reaction mixture is worked up in the usual manner, whereby a product is obtained, crystallizing from nitrobenzene in the form of green crystals, dyeing cotton from an alkaline hydrosulfite vat strong bluish green shades of good fastness properties.

The new compound probably corresponds to the following formula:

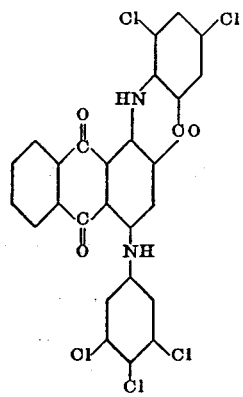

I claim:
1. As new products, the compounds of the probable general formula:

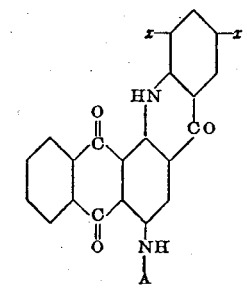

wherein the two $x$'s stand for halogen atoms and A means a halogenated benzene or naphthalene nucleus, said products forming green crystals, difficultly soluble in the usual organic solvents, soluble in strong sulfuric acid with yellow to brown colorations, dyeing cotton from an alkaline hydrosulfite vat strong bluish green to green shades of good fastness properties, especially to light.

2. As new products, the compounds of the probable general formula:

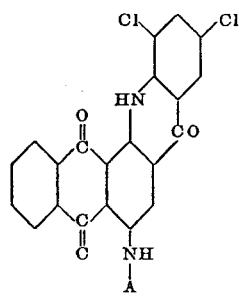

wherein A means a halogenated benzene or naphthalene nucleus, said products forming green crystals, difficultly soluble in the usual organic solvents, soluble in strong sulfuric acid with yellow to brown colorations, dyeing cotton from an alkaline hydrosulfite vat strong bluish green to green shades of good fastness properties.

3. As new products, the compounds of the probable formula:

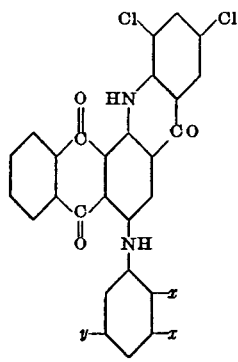

wherein one $x$ stands for hydrogen and the other $x$ and $y$ mean chlorine atoms, said products forming green crystals dissolving in concentrated sulfuric acid with an orange coloration, dyeing cotton from an alkaline hydrosulfite vat bluish green shades of good fastness properties, especially to light.

4. As a new product, the compound of the probable formula:

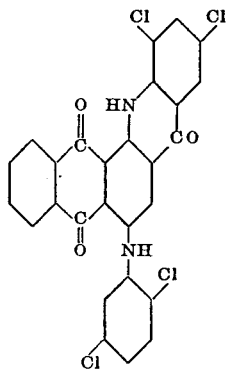

which compound forms green crystals, soluble in concentrated sulfuric acid with an orange coloration, and dyes cotton from a violet vat strong bluish green shades of good fastness properties.

5. As a new product, the compound of the probable formula:

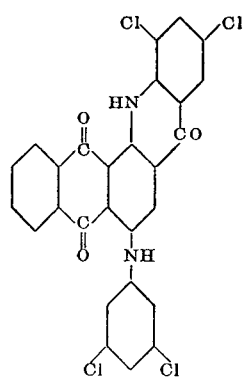

which compound forms green crystals, soluble in concentrated sulfuric acid with an orange coloration, and dyes cotton from a violet vat bluish green shades of good fastness properties.

In testimony whereof I have hereunto set my hand.

ROBERT BERLINER. [L. S.]